Dec. 1, 1970   K. A. KLENZ   3,543,378
CLIPPING APPARATUS
Filed Sept. 11, 1968   6 Sheets-Sheet 1

INVENTOR.
KARL A. KLENZ
BY Gordon Wood
ATTORNEY

INVENTOR.
KARL A. KLENZ
BY Gordon Wood
ATTORNEY

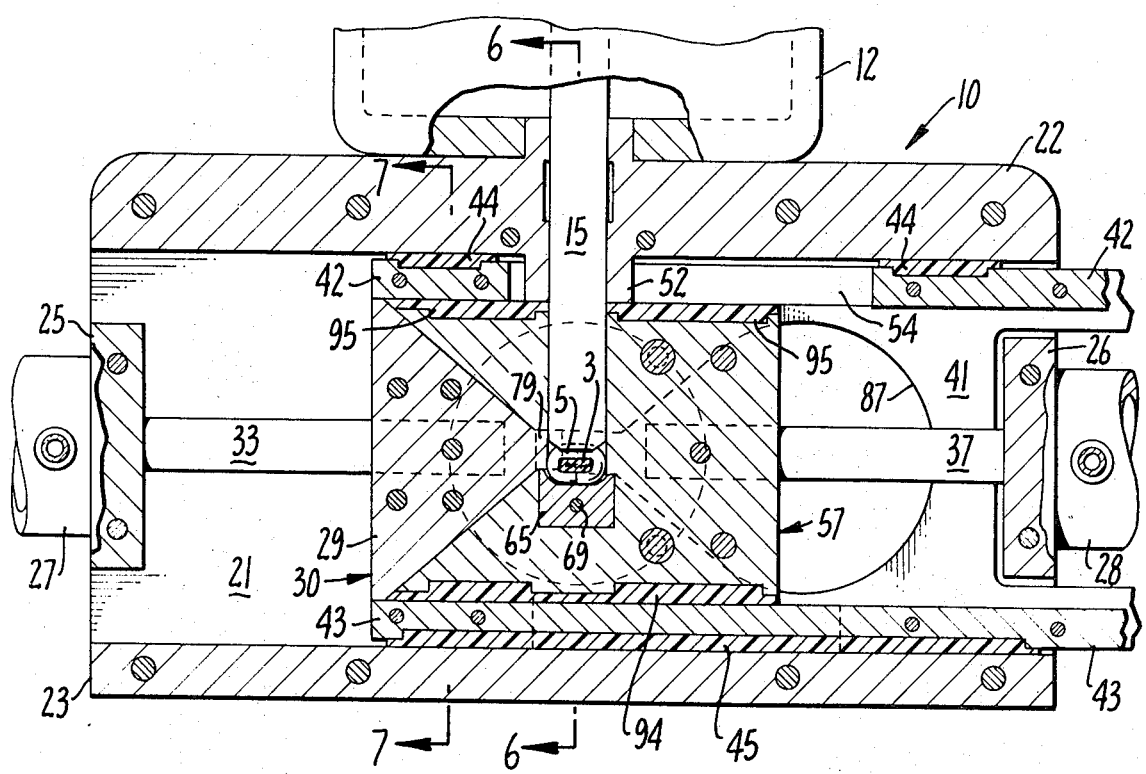
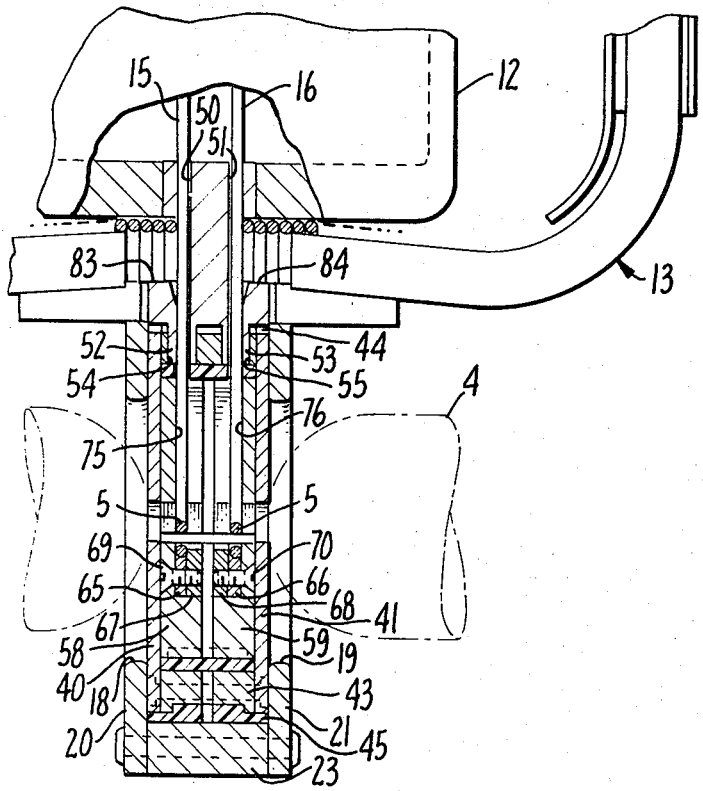
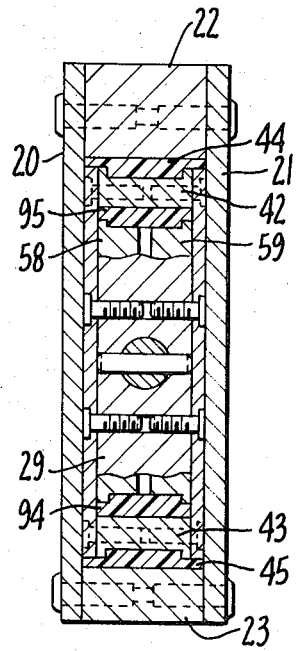

INVENTOR.
KARL A. KLENZ
BY
Gordon Wood
ATTORNEY

INVENTOR.
KARL A. KLENZ
BY Gordon Wood
ATTORNEY

United States Patent Office 3,543,378
Patented Dec. 1, 1970

1

3,543,378
CLIPPING APPARATUS
Karl A. Klenz, Oakland, Calif., assignor to Rheem Manufacturing Company, New York, N.Y., a corporation of California, and Rheem International, Inc., New York, N.Y., a corporation of Delaware
Filed Sept. 11, 1968, Ser. No. 758,998
Int. Cl. B23p 11/00; A22c 11/12
U.S. Cl. 29—243.57                                13 Claims

ABSTRACT OF THE DISCLOSURE

Clipping apparatus for applying a seal or a pair of seals at spaced points along the length of an extruded sausage or like article formed by a stuffing machine. The stuffed article is passed through the apparatus which automatically constricts the article to a relatively small cross sectional extent and applies a clip or pair of clips to form a plurality of serially connected chubs or the like. A modification of the invention permits substantially similar action to seal a flexible article such as the mouth of a bag with the bag being fed laterally into the device.

---

This invention relates to a clipping apparatus which is particularly adapted for use in forming a tight seal around an article such as the mouth of a bag or an extruded sausage casing.

The main object of the invention is the provision of apparatus for applying a seal to an article when it is required that the cross sectional area of such article be constricted prior to application of the sealing clip. In this respect the invention may be considered to be an improvement over prior art devices having a similar function and particularly those devices disclosed in U.S. Pats. Nos. 3,293,736 and 3,377,692.

Another object of the invention is the provision of a clipping apparatus which permits the automatic application of a clip or a pair of clips at spaced points along the length of an elongated flexible article such as a sausage casing. In this respect the disclosed invention is adapted to operate without the intervention of an operator, thus not only enhancing the speed of operation but also the uniformity of the product.

Other objects and advantages will be apparent from the following specification and drawings.

FIG. 5 is a view similar to FIG. 4 but showing the gate and die support mechanism in closed position.

FIG. 6 is a vertical cross sectional view taken in a plane indicated by lines 6—6 of FIG. 5.

FIG. 7 is a vertical cross sectional view taken in a plane indicated by lines 7—7 of FIG. 5.

Figure 1:
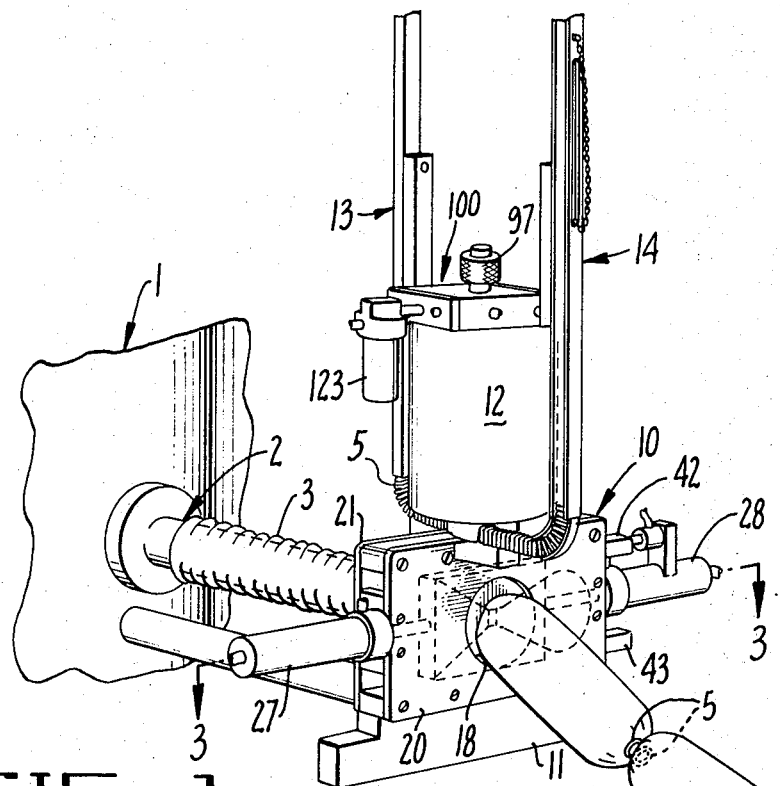
FIG. 1 is a perspective of the preferred form of the invention shown in cooperation with a conventional stuffing machine.

The preferred form of the invention is adapted to be employed with a conventional stuffer generally designated 1 (FIG. 1) which is of the type having a proportioner attachment and which includes a stuffing horn 2 through which sausage material is extruded and around which casing material 3, usually of plastic film, is stored in shirred condition. The present invention provides a means for constricting the extruded casing and the sausage material therein at spaced points along the length of the extruded element and at the same time applying a pair of clips 5 to form a plurality of connected chubs 4.

Figure 2:
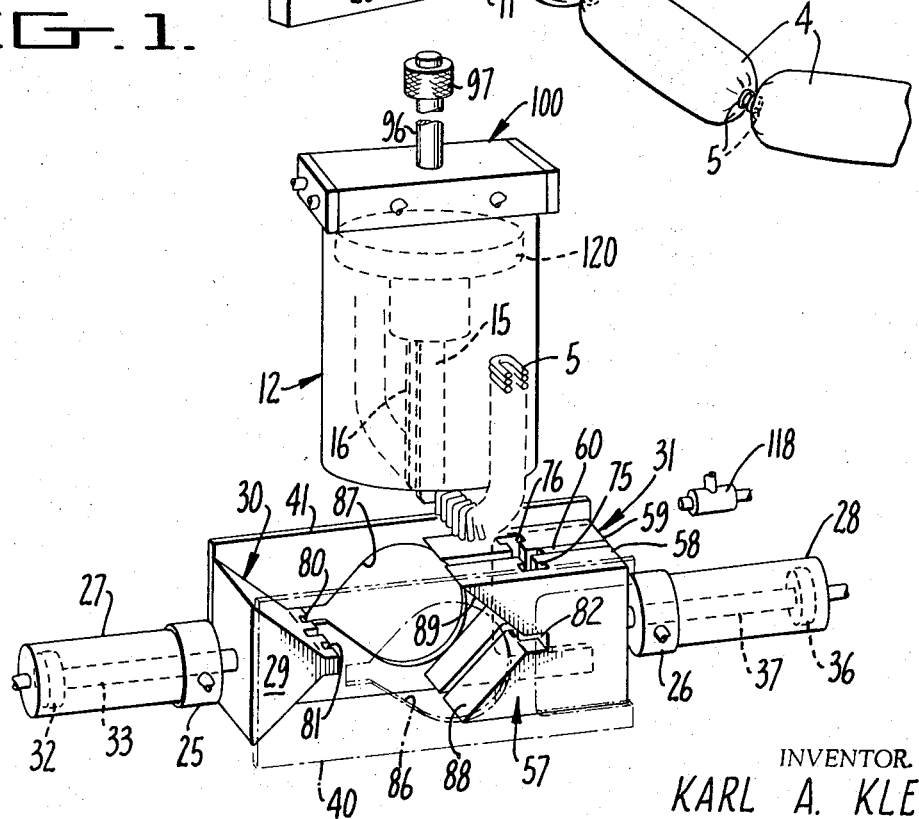
FIG 2 is a semischematic perspective of the invention.

The present invention may be mounted on a suitable base 11 supported on the stuffer 1 and comprises a housing generally designated 10 which supports a clipping cylinder 12. Cooperating with the upper portion of housing 10 are clip rail assemblies 13, 14 by which clips 5 are fed in pairs downwardly and inwardly by gravity to the apparatus to be described. As indicated in FIG. 2, a pair of punches 15, 16 are driven by cylinder 12 downwardly through a working stroke for applying the clips 5.

Figure 3:
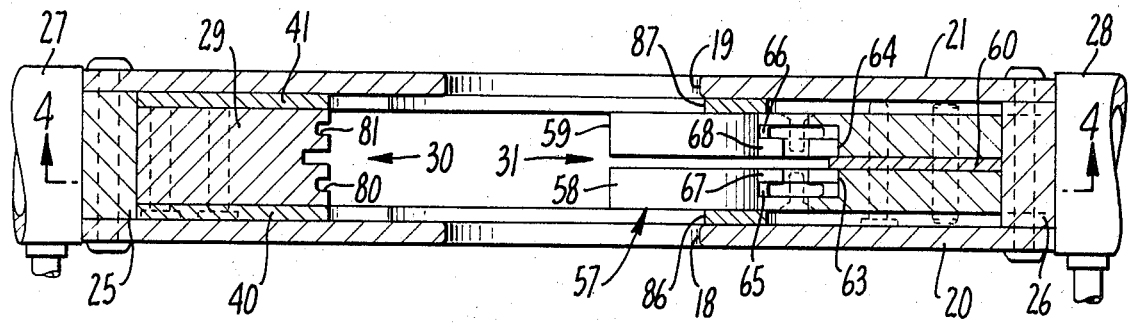
FIG. 3 is a horizontal cross sectional view of the gate and die support mechanism as taken in a plane indicated by lines 3—3 of FIG. 1.

The housing 10 comprises a pair of front and rear cover plates 20, 21 secured along their upper edges by screws to opposite sides of a relatively heavy feed support 22 and to which feed support the clip assemblies 13, 14 are connected. The front and rear cover plates 20, 21 are secured along their lower edges to an elongated base 23. The horizontally spaced opposite ends of plates 20, 21 serve to secure a pair of blocks 30, 57 which in turn support closing cylinders 27, 28 respectively (FIG. 2). The fixed front and rear cover plates 20, 21 are centrally apertured to provide relatively large holes 18, 19 (FIG. 3) through which the filled casing is passed.

The above described housing structure serves to support within it a mechanism which functions to constrict the filled sausage casing extruded from stuffer 1 and at the same time applies a pair of clips 5 at closely spaced points along the length of the casing (FIG. 1). As shown schematically in FIG. 2 said mechanism comprises a gate structure generally designated 30 and a die support structure generally designated 31.

Details of the gate and die support structures will subsequently be described in detail but at this point it may be noted that the closing cylinder 27 is provided with a piston 32 (FIG. 2) connected by piston rod 33 to the gate structure 30 for translating the latter from an outer position shown in FIGS. 2, 4 to an inner working position shown in FIG. 5. Similarly, cylinder 28 is provided with a piston 36 and rod 37 for translating the die support structure from the outer position shown in FIGS. 2, 4 to the inner working position shown in FIG. 5.

Gate structure 30 comprises a relatively heavy block 29 converging in a direction inwardly of the housing 10 and secured at its opposite sides to a pair of guard plates 40, 41 (FIGS. 3, 4) which are supported along their upper and lower edges by support bars 42, 43 respectively. This gate structure is slidably supported on base 23 of housing 10, and, to reduce friction, an insert 45 of Teflon or the like is preferably provided on the lower side of bar 43 and, similarly, Teflon inserts 44 are provided on the upper side of upper bar 42.

The feed support 22 which constitutes the top of housing 10 is formed therein with a pair of vertically extending clip tracks 50, 51 (FIG. 6) along which punches 15, 16 reciprocate. To achieve the required close cooperation between tracks 50, 51 and the die structure 31 the feed support 22 is provided with a pair of rectangular downwardly extending bosses 52, 53 and upper support bar 42 of the gate structure is formed with complementarily formed slots 54, 55 to receive said bosses therethrough to allow reciprocation of the gate structure as above described.

The die support structure 31 is, in effect, a relatively heavy block 57 which is formed with a re-entrant angle to make it generally complementary to the converging portion of gate structure 30. The fabrication of block 57 may be simplified by forming it in two sections by plates 58, 59 with a rectangular spacer 60 spacing said plates apart slightly at their outer portions adjacent cylinder 28 (FIG. 2), the assembly being fixedly connected by machine screws.

Plates 58, 59 of the die support block 57 are formed with horizontally inwardly opening recesses 63, 64 respectively for receiving therein dies 65, 66 (FIG. 6). Cooperating with said dies 65, 66 are similarly formed anchor plates 67, 68 also received in said recesses. Machine screws, 69, 70 pass through the outer sides of plates 58, 59 through holes in dies 65, 66 and into threaded engagement with anchor plates 67, 68.

Die support plates 58, 59 are formed with vertically extending slots 75, 76 respectively extending upwardly from and in registration with dies 65, 66. When the die support structure is in its inner position of FIG. 5 said slots 75, 76 are in alignment with clip tracks 50, 51 in feed support 22. In this manner a pair of clips 5 are urged downwardly along the various sections which constitute the clip tracks by punches 15, 16 and into engagement with dies 65, 66 upon each cycle of the apparatus.

Figure 4:
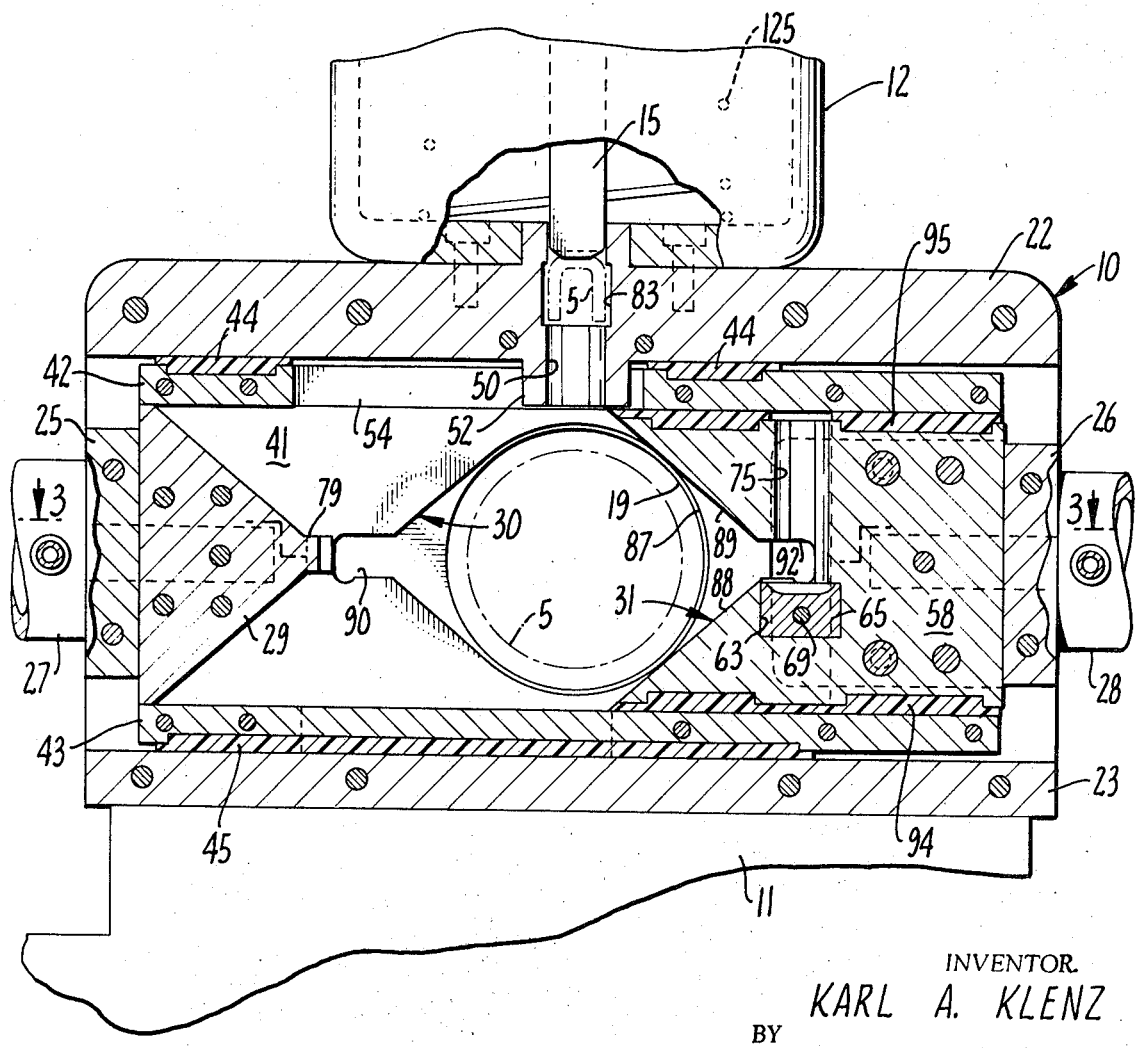
FIG. 4 is a vertical sectional view of the gate and die support mechanism as taken in the plane indicated by lines 4—4 of FIG. 3.

As best seen in FIGS. 2, 4, 5, the gate block 29 is provided with a horizontally inwardly projecting generally rectangular extension 79 which is also formed with vertically extending slots 80, 81 (FIG. 3) constituting further extensions of the clip tracks. Die support plates 58, 59 are similarly formed with generally rectangular recesses 82 (FIG. 2) for receiving the extension 79 of the gate therein. By this structure it will be seen that when the gate and die support structures are in engagement in their inner operative position of FIG. 5 the clips 5 are adequately supported for movement down the above noted three-part clip tracks.

As best seen in FIGS. 4, 6, clips 5 from the clip rail assemblies 13, 14 are fed into the feed support 22 through openings 83, 84 formed therein so that upon each vertical reciprocation a pair of clips are deformed around casing 3 at spaced points along the length of the latter equal to the spacing between the clip tracks.

Since the stuffer 1 extrudes a continuous length of tightly stuffed casing it is necessary to constrict the filled casing and reduce its cross sectional area sufficiently to permit the legs of the clips 5 to straddle the constricted filled casing. This is done by holes 86, 87 in guard plates 40, 41 of the gate assembly and by the inwardly converging edges 88, 89 of die support plates 58, 59. The shape of holes 86, 87 is best seen in FIG. 4; said holes being formed with their major circular portions concentric with holes 18, 19 in cover plates 20, 21 and converging toward the gate block 29 to a generally rectangular slot portion 90. Die support plates 58, 59 are similarly provided with slot portions 92 which cooperate with slots 90 in guard plates 40, 41 to provide a relatively small opening to receive the constricted casing and to position it just above dies 65, 66. It will be understood that the converging side edges of openings 86, 87 in guard plates 40, 41 and the converging side edges 88, 89 in die support plates 58, 59 contribute to a smooth constriction in the cross sectional area of the filled casing without injury to the latter.

The die supports 58, 59 are proportioned to slide within the upper and lower support bars 42, 43 of the gate structure and, to reduce friction, Teflon inserts 94 are provided on the lower edges of said die supports and inserts 95 are similarly provided on the upper edges.

The head 100 of clipping cylinder 12 (FIG. 1) is generally rectangular and is formed to provide a pair of horizontally extending bores 101, 102 (FIG. 10) closed at their opposite ends by heads 103, 104. The particular structure of head 100 is not described herein and no claim is made to the same in this application. Details of said head and its exact mode of operation may be seen in copending application Ser. No. 762,288 filed Sept. 16, 1968.

Slidably received in bores 101, 102 are two-position silde valves 105, 106 respectively which are actuated by fluid pressure as indicated. Air under pressure is connected by lines 109, 110 to bores 101, 102 respectively. In the normally closed position shown valve 106 exhausts clipping cylinder 12 through port 111. In the normally open position shown valve 105 connects the fluid pressure line 109 with line 112 which applies pressure to the inner ends of cylinders 27, 28 holding the gate and die support mechanism in open position.

Air is supplied to the right hand end of bore 101 from line 122 through a solenoid operated valve 115 which is operatively connected to stuffer 1 so that it operates after a predetermined quantity of sausage material has been extruded. Upon actuation of valve 115 slide valve 105 is shifted to the left to its operative position thereby disconnecting line 112 from the compressed air supply and applying pressure through line 116 to the outer ends of cylinders 27, 28 causing the gate and die support mechanism to move to their inner operative position, the inner ends of the cylinders 27, 28 being exhausted through line 121 and pressure control valve 117 which closes upon reduction in pressure in line 112. Upper and lower bars 42, 43 in housing 10 extend outwardly from the housing when the mechanism closes and at that time the outer end of upper bar 42 opens normally closed valve 118 which connects pressure line 116 with the end of bore 102 through line 119.

The opening of valve 118 signals the readiness of the gate and die support mechanism to receive a pair of clips and pressure line 110 is thus connected by valve 106 with the upper end of cylinder 12 thereby urging the piston 120 downwardly through its clipping stroke. When the pressure in cylinder 12 builds up to a predetermined amount corresponding to the desired amount of force on clip 5, pressure control valve 123, connected with said cylinder, opens and admits air under pressure through line 124 to the ends of bores 101, 102 returning valves 105, 106 to their former positions. This causes the gate and die support mechanism to open and permits compression spring 125 in clipping cylinder 12 to return the piston 120 and punches 15, 16 to their upper position to await the next cycle to be initiated by opening of valve 115. The cylinder 12 is provided with a crimp control mechanism that includes a shaft 96 fixedly secured to piston 120 and slidably received through a suitable aperture centrally of head 100. An adjustable nut 97 is threadedly secured to the outer end of shaft 96 for varying the clipping force. Details of this crimp control mechanism are disclosed in copending application Ser. No. 762,288 filed Sept. 16, 1968.

The above described mechanism is completely automatic in that chubs 4 may be automatically formed without intervention by an operator. All that an operator need do is to cut the casing 3 between whatever pair of clips 6 is necessary to constitute the predetermined length of the string of chubs.

If desired, a cut-off knife may be incorporated in the gate and die support mechanism to automatically cut between pairs of chubs 4 at any desired time. In fact such cut-off knife may be operated to cut each chub from the string of chubs.

Figure 11:
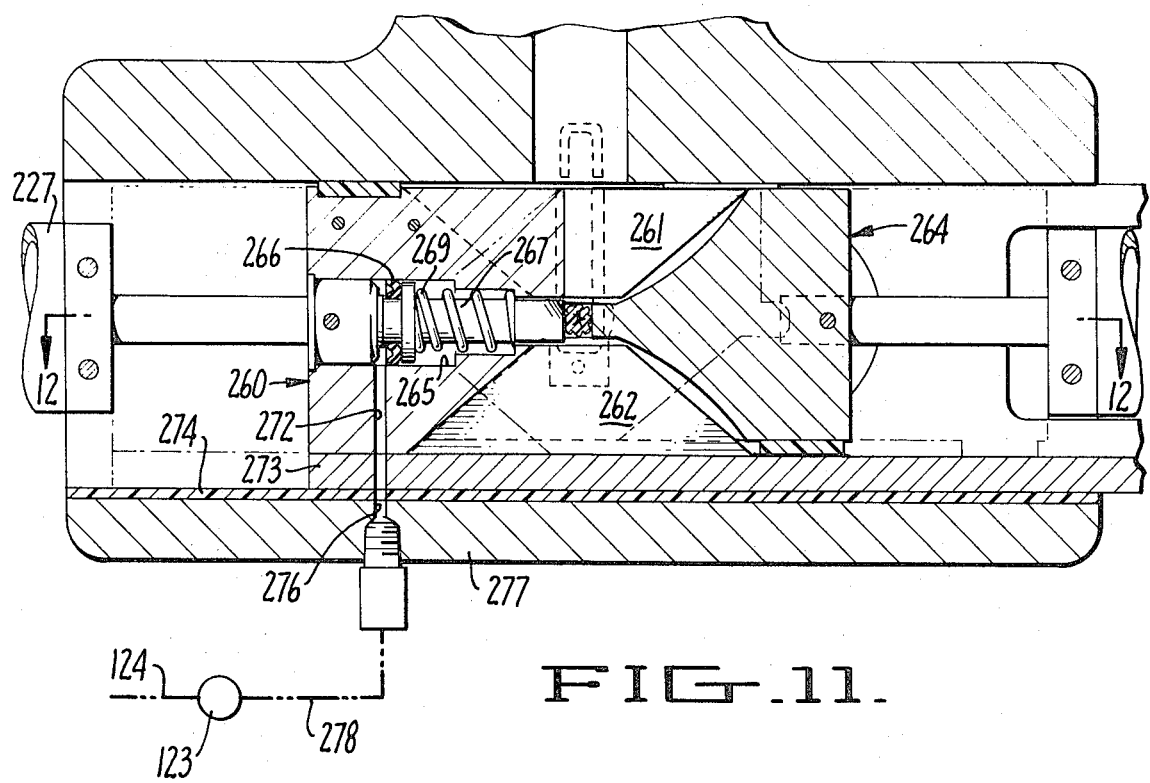
FIG. 11 is a fragmentary vertical sectional view similar to FIG. 5 showing a form of the invention which incorporates a cut-off knife.
Figure 12:
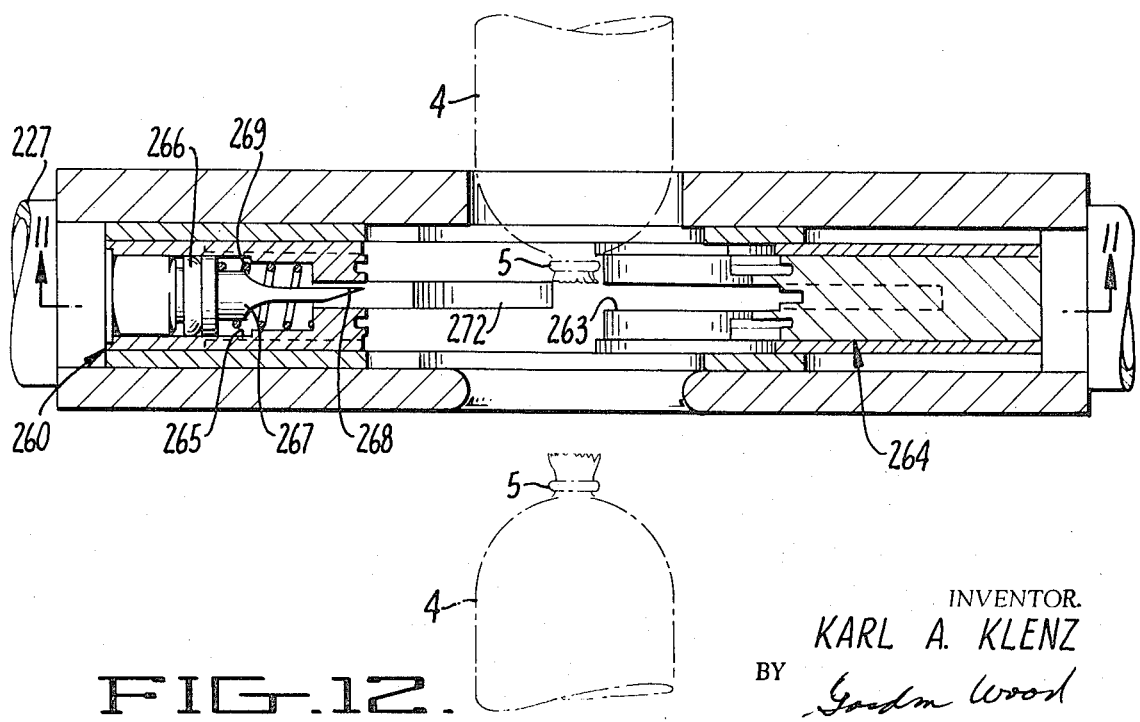
FIG. 12 is a horizontal section of the modified form of apparatus shown in FIG. 11.

FIGS. 11, 12 show a modified form of the invention incorporating a cut-off knife and providing a gate and die support structure that enhances the constricting action on the casing. The gate 260 in FIGS. 11, 12 is similar to gate 30 of FIG. 2 but is provided with upper and lower generally triangular extensions 261, 262 centrally of the width of the gate and which extensions fit within a vertically extending slot 263 in die support 264 when the gate and die support structure are in closed position. In certain instances the additional constricting elements 261, 262 are desirable to insure the required reduction in the cross sectional area of the stuffed casing prior to application of the clips.

Gate 260 is provided with a central bore 265 in which is slidably received a piston 266 formed at one end with an extension 267 sharpened to provide a cutting blade 268. A helical compression spring 269 surrounding extension 267 serves to urge the blade 268 to its inner position at all times. When air pressure is applied to the left-hand end of bore 265 the blade is propelled against the casing between the two clips 5 cutting said casing.

Figure 10:
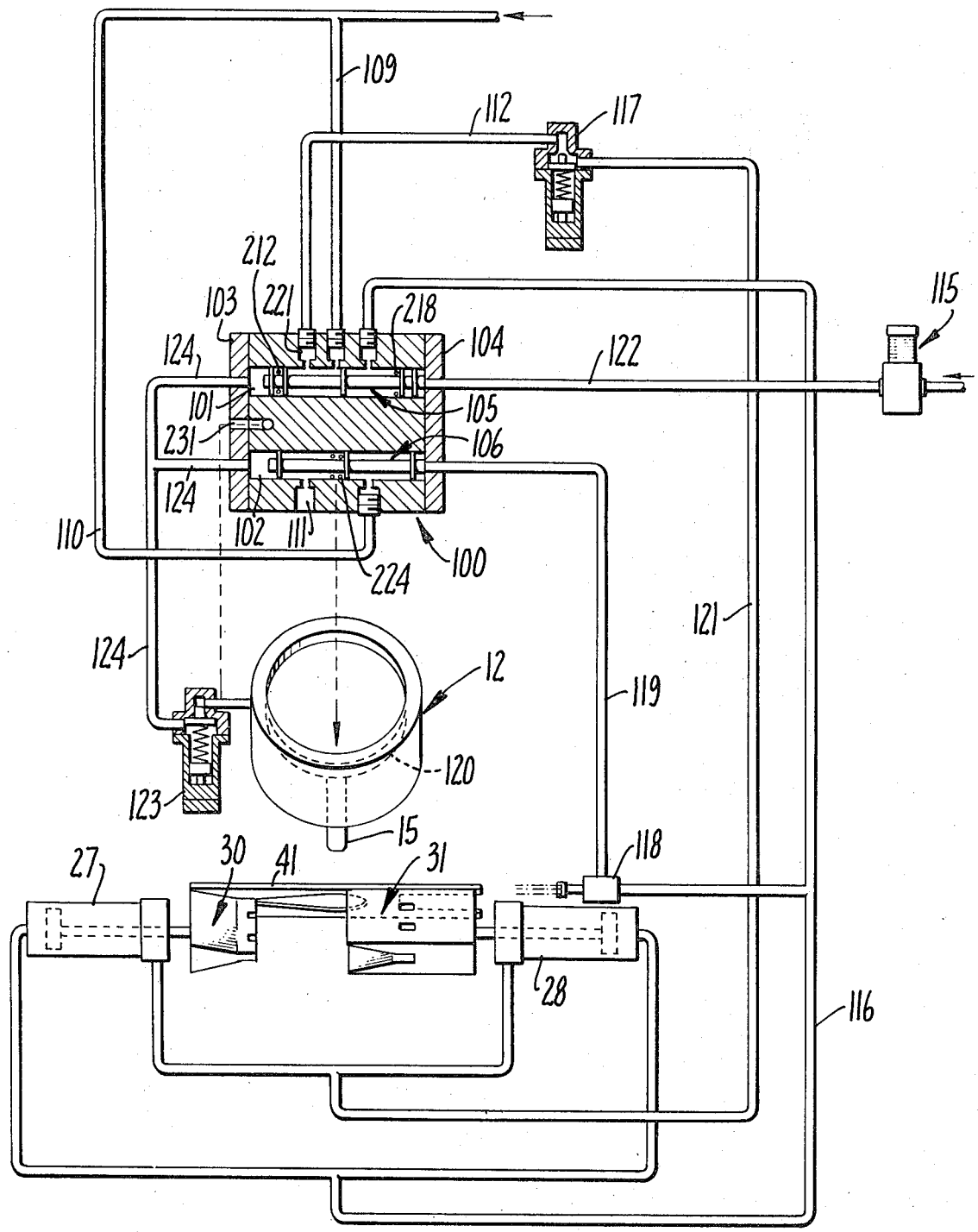
FIG. 10 is a schematic piping arrangement.

As stated above, the string of chubs formed by the apparatus may be cut after a predetermined number of chubs have been formed. On the other hand, it may be desirable to separate each chub from the string of chubs by cutting the casing between a pair of clips. In FIG. 11 the means for performing the latter operation is shown. A relatively small vertically extending bore 272 is formed through gate 260, its lower support bar 273 and Teflon liner 274. When the gate 260 is in its inner position said bore 272 registers with a bore 276 in the lower wall 277 to which is connected a line 278 leading to pressure control valve 123 and which line 278 may be connected with line 124 (FIG. 10).

In operation, when the clipping step has been performed and high pressure air from cylinder 12 opens valve 123 the same air flow which returns valve elements 105, 106 to their inoperative position also is directed into bore 265 to actuate the cutting blade. The formation of bores 272, 276 described above insures that the cut-off blade is not actuated unless the gate is in its inner position.

If it is desired to cut the casing after a predetermined number of chubs have been formed in a string it is a simple matter to place a valve in line 278 for manual or automatic opening when desired.

Figure 8:
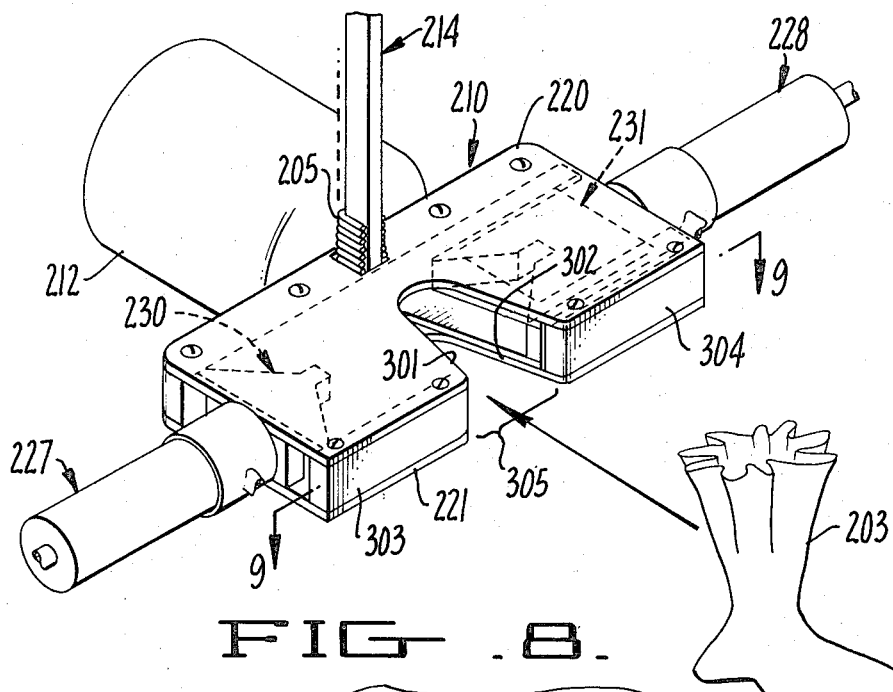
FIG. 8 is a perspective of a modified form of the invention.
Figure 9:
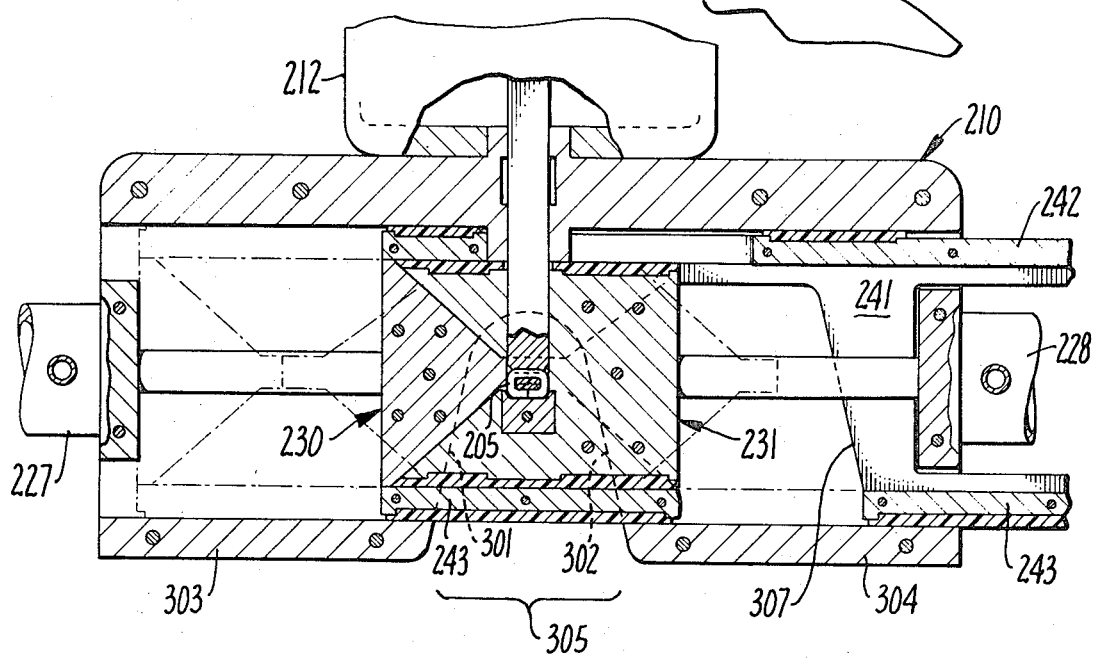
FIG. 9 is a horizontal cross sectional view taken in a plane indicated by lines 9—9 of FIG. 8.

Another modified form of the invention is shown in FIGS. 8 and 9 and in this case the device is adapted to seal articles one at a time as distinguished from sealing an elongated article at spaced points along the length of the same. The modification of FIGS. 8 and 9 contemplates the use of the device, for example, in sealing the open end of a plastic bag 203 which may contain a food product. In this form of the invention it is desirable to be able to insert the article manually in a horizontal direction as indicated in FIG. 8 into the mechanism for performing the gathering and sealing steps. To this end the housing generally designated 210 is horizontally disposed as distinguished from the vertical arrangement shown in FIG. 1. Similarly, the clipping cylinder 212 drives the punch horizontally for deforming a clip 205 fed vertically downwardly into the mechanism by a vertically extending clip rail assembly 214.

In this case the opposite cover plates 220, 221 are provided with relatively large converging notches 301, 302 respectively and the bar 23 of the preferred form of the invention is replaced by shorter bars 303, 304 thus providing a laterally directed opening through which the mouth of the bag 203 may be introduced into the mechanism.

The gate structure 230 and die support structure 231 are substantially similar to the corresponding structures 30, 31 of the preferred form of the invention but in this case it is necessary to provide a "bridge" across the gap 305. The guide plates 241 which are secured to the gate structure 230 are provided with openings 307 and the support bar 243 is formed in two sections to provide the necessary gap corresponding to the gap 305 of the housing. In this case the opposite support bar 242 of the gate structure may be the same as bar 42 of the preferred form.

Upon closing movement of the mechanism of FIGS. 8 and 9 the left-hand portion of support bar 243 spans the gap 305 and, as in the preferred form, the die support 231 also spans the gap. However, in this case the mechanism is simplified in that only one clip track is required.

I claim:

1. In a clipping device for constricting and tying an article of deformable material,
   a pair of spaced apart members supported for movement toward each other along a straight path of travel toward a clipping point,
   said members being formed with opposed surfaces shaped to progressively constrict the cross sectional area of said article during said movement,
   one of said members being provided with a die adapted to be engaged by a clip at said point, and
   a punch slidably supported for movement at right angles to said path for deforming such clip on said die in tight encircling relationship to said article.

2. A device according to claim 1 wherein said members are operated by a pair of fluid driven cylinders provided with pistons for driving said members along said path of travel, means responsive to movement of one of said members for urging said punch along said track.

3. A device according to claim 1 wherein a housing is provided for slidably supporting said members, an elongated clip track fixedly secured to said housing and adapted to receive a U-shaped clip therein for movement along said track by said punch.

4. A device according to claim 3 wherein one of said members is formed to provide a second clip track in continuation of said first mentioned clip track when said one member is at said point.

5. A device according to claim 3 wherein said housing is provided with an opening at the side opposite said punch for receiving such article therethrough.

6. A device according to claim 3 wherein both of said members are formed with a clip track in alignment with said first mentioned clip track when said members are at said clipping point.

7. A device according to claim 3 wherein cutting means is provided for cutting said article adjacent a clip after the latter is applied.

8. In a clipping device adapted to be used in conjunction with a sausage stuffer which extrudes a continuous elongated filled casing,
   a housing provided with openings at its opposite sides for receiving such filled casing therethrough,
   a pair of members slidably disposed within said housing for movement along a straight path of travel toward each other from a spaced apart open position to a closed clipping position in engagement with each other,
   said members being formed with opposed surfaces shaped to constrict the cross sectional area of said filled casing during said movement,
   one of said members being provided with a die adapted to be engaged by a clip at said clipping position,
   said housing including a track at right angles to said path adapted to receiving a U-shaped clip therein for movement of said clip along said track and into engagement with said die.

9. A device according to claim 8 wherein means responsive to extruding action of said stuffer moves said members from a spaced apart open position to a closed clipping position, and means is provided for urging said clip along said track and into engagement with said die after said members are in said clipping position.

10. A device according to claim 8 wherein an additional clip track is provided to permit the application of a pair of clips to said casing at closely spaced points on said casing.

11. A device according to claim 10 wherein cutting means is provided for cutting said casing between a pair of said clips.

12. A device according to claim 11 wherein said cutting means includes a fluid actuated cylinder in one of said members and a cutting blade actuated thereby.

13. A device according to claim 12 wherein said one member and housing are provided with bores adapted to register when said one member is in its clipping position for conducting fluid to said cylinder.

References Cited

UNITED STATES PATENTS

| | | | |
|---|---|---|---|
| 2,886,816 | 5/1959 | Hill | 29—243.57 |
| 3,389,533 | 6/1968 | Tipper | 53—138 |
| 3,455,010 | 7/1969 | Busler | 29—243.57 |

FOREIGN PATENTS

| | | |
|---|---|---|
| 1,123,588 | 2/1962 | Germany. |

ROBERT C. RIORDON, Primary Examiner

G. F. GRAFEL, Assistant Examiner